(12) United States Patent
Mizuno et al.

(10) Patent No.: US 7,159,228 B2
(45) Date of Patent: Jan. 2, 2007

(54) CONVERTER SUPPORT DEVICE WITH SLIDER

(75) Inventors: Osamu Mizuno, Osaka (JP); Yutaka Murakami, Hirakata (JP); Tohru Nakamura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 474 days.

(21) Appl. No.: 10/316,702

(22) Filed: Dec. 10, 2002

(65) Prior Publication Data

US 2003/0107955 A1 Jun. 12, 2003

(30) Foreign Application Priority Data

Dec. 12, 2001 (JP) .............................. 2001-378348

(51) Int. Cl.
G11B 21/21 (2006.01)
G11B 17/32 (2006.01)
G11B 5/127 (2006.01)

(52) U.S. Cl. ................ 720/672; 360/236.2; 360/236.3; 360/236.4; 360/236.5; 360/236.6; 360/236.7; 360/236.8; 360/236.9

(58) Field of Classification Search .. 360/236.1–236.9; 720/672, 688, 687; 369/244.1
See application file for complete search history.

(56) References Cited

U.S. PATENT DOCUMENTS

| | | | | |
|---|---|---|---|---|
| 3,398,870 A | * | 8/1968 | Mullan et al. ............... 360/122 |
| 3,678,482 A | * | 7/1972 | Billawala ................. 360/235.4 |
| 4,553,184 A | * | 11/1985 | Ogishima ................. 360/235.8 |
| 4,646,180 A | * | 2/1987 | Ohtsubo ................... 360/236.6 |
| 4,802,042 A | * | 1/1989 | Strom ...................... 360/236.3 |
| 5,086,360 A | * | 2/1992 | Smith et al. ............. 360/236.6 |
| 5,309,303 A | * | 5/1994 | Hsia et al. ............... 360/236.1 |
| 5,532,890 A | * | 7/1996 | Dorius et al. ............ 360/236.3 |
| 5,535,075 A | * | 7/1996 | Takahashi et al. .......... 369/256 |
| 5,682,280 A | * | 10/1997 | Takahashi et al. ....... 369/13.17 |
| 5,940,249 A | * | 8/1999 | Hendriks ................. 360/235.6 |
| 5,943,312 A | * | 8/1999 | Takahashi et al. .......... 720/672 |
| 5,973,881 A | * | 10/1999 | Ajiki ....................... 360/235.8 |
| 6,031,693 A | * | 2/2000 | Takahashi et al. ....... 369/13.17 |
| 6,067,207 A | * | 5/2000 | Kurita ..................... 369/13.17 |
| 6,731,587 B1 | * | 5/2004 | Mizuno et al. ............. 720/648 |

FOREIGN PATENT DOCUMENTS

| | | | |
|---|---|---|---|
| EP | 0 566 998 | | 10/1993 |
| JP | 6-195851 | | 7/1994 |
| JP | 7-129902 | | 5/1995 |
| JP | 08235556 A | * | 9/1996 |
| JP | 09305903 A | * | 11/1997 |
| JP | 10-283604 | | 10/1998 |
| JP | 11-149735 | | 6/1999 |

* cited by examiner

*Primary Examiner*—Angel C Castro
*Assistant Examiner*—Christopher R. Magee
(74) *Attorney, Agent, or Firm*—Hamre, Schumann, Mueller & Larson, P.C.

(57) ABSTRACT

A converter that records or reproduces information to or from a recording medium while making a movement relative to the recording medium is mounted on a slider. The slider has at least a pair of openings on a side face thereof, and airflow generated by the movement relative to the recording medium flows in via one of the paired openings, passes in a vicinity of a surface of the converter other than a surface thereof facing the recording medium, and thereafter flows out via the other one of the paired openings. With this, the ability to cool the converter is improved.

15 Claims, 11 Drawing Sheets ent with respect to the disk as a recording medium. In many cases of magnetic tapes, flexible disks, etc., a converter itself is brought into contact with the medium, and herein the slider performs a function in expanding a slid area, thereby reducing a contact pressure between the medium and the converter so as to prevent the abrasion of both the medium and the converter.

CONVERTER SUPPORT DEVICE WITH SLIDER

BACKGROUND OF THE INVENTION

1. Field of the Invention

The present invention relates generally to a converter support device that carries out a recording or reproducing operation with respect to a recording medium while moving relative to the recording medium with a predetermined distance being kept therebetween. The present invention particularly relates to a magnetic head preferably used for magnetic field modulation in magneto-optical recording.

2. Related Background Art

Typical examples of conventional magneto-optical recording magnetic heads include magnetic heads used with respect to mini-disks (hereinafter referred to as MDs). One example of such magnetic heads for MDs is disclosed in JP6(1994)-195851A.

The magneto-optical recording applied to MDs and the like is a kind of perpendicular thermomagnetic recording, in which the recording operation is carried out as follows: a medium is heated partially by a laser beam so that the heated portion of the medium has a decreased coercive force, and a perpendicular magnetic field modulated according to recording signals is applied thereto so that the medium is magnetized and a perpendicular magnetic domain is formed there. This modulated perpendicular magnetic field is generated by a magnetic head. Reproduction is carried out by detecting the rotation of a plane of a reflected polarized light due to the Kerr effect and reading a magnetization direction of each perpendicular magnetic domain.

Data recorded in MDs mainly are music data, but the magneto-optical recording is used also generally for the recording of data and pictures. For the latter purposes, it is necessary to increase a transfer rate by one order of magnitude or more in the case where a MD is used. As a result, recently it is required to increase the frequency of the modulated magnetic field.

The following will describe a magnetic head structure mainly for use with a MD, as a conventional converter support device. FIG. 14A illustrates an overall configuration of this example (see, for example, JP6-195851A). FIG. 14B is a perspective view of a slider mounted on the magnetic head structure shown in FIG. 14A. Further, FIG. 15 is a perspective view illustrating principal parts of a tip of the magnetic head structure shown in FIG. 14A, on which the slider is to be mounted. FIG. 16 is a side cross-sectional view illustrating a state in which the slider is slid on a disk as a recording medium.

In FIG. 14A, 101 denotes a sliding-type slider for use with a MD. Generally, a slider principally functions as a mechanical interface with a recording medium that relatively moves, and in the case where the medium is a MD, a slider is brought into contact with and slid on the medium so as to keep a distance between the converter and the medium.

It should be noted that a slider for fixed magnetic disks keeps a distance between a converter and a medium by levitation due to airflow that is generated by a relative movement with respect to the disk as a recording medium. In many cases of magnetic tapes, flexible disks, etc., a converter itself is brought into contact with the medium, and herein the slider performs a function in expanding a slid area, thereby reducing a contact pressure between the medium and the converter so as to prevent the abrasion of both the medium and the converter.

The slider 101 is made of a resin, and is mounted on a converter composed of a magnetic core 102 and a coil 104 (described later), bonded with the converter so as to enclose it. The magnetic core 102 has an E-shaped cross section and is made of ferrite or the like.

103 denotes a suspension that is composed of a metal elastic body made of a material such as stainless steel, beryllium copper, or phosphor bronze, and the slider 101 is bonded on an end (free end) of the suspension 103.

A spring portion 103a, formed as a part of the suspension 103, generates a force pressing the slider 101 toward a disk 10 side. A gimbal 103b is deformed, thereby causing the slider 101 to change its attitude according to a relative tilt of a surface of the disk 10 and the like.

105 denotes a head base made of a material with high stiffness, for instance, a stainless steel plate. The head base 105 fixes the suspension 103 in the vicinity of the spring portion 103a to facilitate the attachment of the entire magnetic head to a disk device. A protrusion 105a is formed on an end of the head base 105 on the slider 101 side so as to pass with play through an engagement hole 103d provided at the end of the suspension 103 on the slider 101 side. Thus, the protrusion 105a and the engagement hole 103d form a shock-resistant structure such that when a shock with a significant magnitude is applied to the entire magnetic head, the protrusion 105a collides with the periphery of the engagement hole 103d, thereby preventing plastic deformation and damage of the suspension 103.

An example of a slid surface of the slider 101 is disclosed by JP7(1995)-129902A, whose configuration is illustrated in FIG. 14B. On a side of the slider 101 facing the disk 10, a cylindrical-shaped surface 101a is formed as a sliding surface to be brought into contact with the disk 10. 102a denotes a magnetic pole of the magnetic core 102 exposed to the disk side. The cylindrical-shaped surface 101a protrudes on the disk side to a predetermined extent, as compared with the magnetic pole 102a.

A slidable resin material having excellent abrasion-resistance and some lubricity is applied to the disk-facing surface of the slider 101 including the cylindrical-shaped surface 101a, so as to prevent the abrasion and damage of the slider 101 and the disk 10.

FIG. 15 illustrates principal parts of the tip of the magnetic head structure. A tonguelet 103c is formed on a tip of the suspension 103, to be bonded with the slider 101.

In the case where the slider 101 is brought into contact with and slid with the disk 10 as a recording medium, the spring portion 103a is deformed elastically to apply a predetermined load on the slider 101 in a direction toward the disk 10, which causes the gimbal 103b to be deformed elastically so as to maintain an attitude of the slider 101 relative to the disk 10 while counteracting tilt displacements of the disk 10. Consequently, the magnetic pole 102a is brought into the proximity to a recording film of the disk 10.

FIG. 16 is a cross-sectional view illustrating a state of sliding. The converter composed of the magnetic core 102 and the coil 104 is mounted on the slider 101 as a converter-mounted part so that the converter is enclosed therein. The disk 10 moves in a direction indicated by an arrow A.

In this state, a modulated magnetic field generated by the coil 104 is induced by the magnetic core 102 and is applied via the magnetic pole 102a to the recording film heated by a converged laser beam (not shown). Thus, the thermomagnetic recording is carried out.

However, the foregoing conventional converter support device has the following problems.

For instance, for the speed enhancement such as the improvement of a transfer rate of recorded information with a view toward image recording, it is necessary to increase the modulation frequency of the magnetic field. Furthermore, for the high density of recording in a medium, it is necessary to increase a coercive force of the medium, and for this purpose, it is necessary to increase the strength of the magnetic field. These increase eddy-current loss and hysteresis loss, thereby increasing the power consumption in the converter. Furthermore, the flowing of current (or the recording of information) causes the converter to generate heat due to coil resistances or the like, thereby increasing the power consumption. The power consumed by the converter is turned into heat, thereby raising the temperature of the magnetic core 102 and the coil 104 composing the converter. Since the slider 101 is made of a resin material as a kind of heat insulator, it is difficult to dissipate heat from the electromagnetic transducer enclosed in the resin material. Therefore, slight heat generation causes a great temperature rise.

On the other hand, generally, a magnetic material such as a magnetic core has a Curie temperature, and if the temperature rises above the Curie temperature due to heat generation occurring, for instance, when large current at a high frequency is supplied, the magnetism is lost, which causes impedance to decrease excessively. This causes a large current to flow, thereby further inducing a temperature rise. Finally, this leads to a thermal runaway phenomenon in which burnout of a coil insulation coating and damage of a driving circuit occur. Even if the insulation coating of the coil is not damaged, deterioration of the insulation property or loss of life at high temperature is expected.

Furthermore, though not being described in detail, regarding another converter, for instance, an electrical/optical converter such as a semiconductor laser, it is important to use shorter-wavelength light for high-density recording/reproduction. However, light with a short wavelength has high energy, thereby generating much heat. On the other hand, since in the case of a semiconductor laser, the operation temperature significantly affects life, it is not easy to use the short-wavelength light in a state of being cooled insufficiently.

Thus, in various types of converters, the temperature rise is a significant constraint to the improvement of performances thereof.

Furthermore, in the conventional example, the magnetic core 102 is fixed to the slider 101 by adhesion or the like. Here, a thermal expansion coefficient of the magnetic core 102 and that of the slider 101 are significantly different. Furthermore, since the slider 101 is made of a resin with slidability, it generally has inferior adherability. Therefore, the adhesion is impaired with repetitive thermal expansion and shrinkage over a long period of time, whereby the magnetic core 102 is separated from the slider 101. This makes it impossible to apply a sufficient magnetic field to the recording film, thus leading to a problem in reliability.

Furthermore, when a shock is applied to the magnetic head, an inert force is exerted to, as a point of action, the vicinity of the converter composed of the magnetic core 102 and the coil 104, which has the greatest mass. Since the shock-resistant structure composed of the protrusion 105a and the engagement hole 103d are spaced from the converter to which the inert force is exerted, a significant moment is generated by the inert force, with an engaged portion of the shock-resistant structure functioning as a fulcrum. The moment damages the vicinity of the engagement hole 103d and the gimbal 103b, or causes the protrusion 105a to be disengaged from the engagement hole 103b.

SUMMARY OF THE INVENTION

Therefore, with the foregoing in mind, it is a first object of the present invention to provide a converter support device with high reliability that is capable of suppressing a temperature rise and whose performance can be improved readily. Furthermore, it is a second object of the present invention to provide a converter support device with an excellent shock-resistant property.

A first converter support device of the present invention includes a converter that records or reproduces information to or from a recording medium while moving relative to the recording medium, and a slider that separates the converter from the recording medium at a predetermined distance. The slider has at least a pair of openings on a side face thereof, and airflow generated by the movement relative to the recording medium flows in via one of the paired openings, passes in a vicinity of a surface of the converter other than a surface thereof facing the recording medium, and thereafter flows out via the other one of the paired openings.

Further, a second converter support device of the present invention includes a converter that records or reproduces information to or from a recording medium while moving relative to the recording medium, a slider that separates the converter from the recording medium at a predetermined distance, and a suspension having a fixed end on one side and a free end on the other side, with the slider being mounted on the free end. The suspension is elastically deformable in a direction in which the slider approaches to or separates from the recording medium. A plurality of engagement pieces are extended in a direction substantially parallel to the recording medium, either from a part of the suspension toward the slider, or from a part of the slider toward the fixed end of the suspension. The plurality of engagement pieces include a lower engagement piece provided on a side closer to the recording medium, and an upper engagement piece provided on a side farther from the recording medium. The lower engagement piece is arranged substantially symmetrically with respect to a symmetry plane that substantially passes through a center of gravity of the slider, that is substantially parallel to a direction of the relative movement, and that is substantially perpendicular to the recording medium, and so is the upper engagement piece. The lower engagement piece and the upper engagement piece are arranged so that they do not overlap each other in a direction parallel to the symmetry plane. When the slider is displaced relative to the suspension, at least a part of the plurality of engagement pieces is engaged with the suspension or the slider before a portion of the suspension in the vicinity of the slider is deformed plastically.

DETAILED DESCRIPTION OF THE INVENTION

Figure 1A:
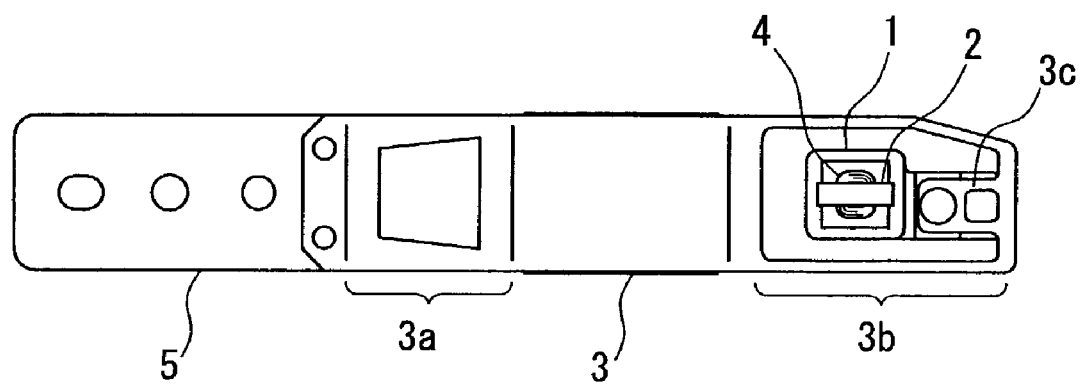
FIG. 1A is a plan view illustrating an overall configuration of a converter support device according to Embodiment 1 of the present invention.

In the first converter support device of the present invention, the slider has at least a pair of openings on a side face thereof. Airflow generated by the movement relative to the recording medium flows in via one of the paired openings, passes in a vicinity of a surface of the converter other than a surface thereof facing the recording medium, and thereafter flows out via the other one of the paired openings. This allows the converter to be cooled by the airflow, thereby suppressing temperature rise. Consequently, this makes it possible to obtain a converter support device with high reliability, which allows for higher-level performance readily.

Furthermore, in the second converter support device of the present invention, when the slider is displaced relative to the suspension, at least a part of the plurality of engagement pieces is engaged with the suspension or the slider before a portion of the suspension in the vicinity of the slider is deformed plastically. This improves the shock-resistant performance, and hence, makes it possible to obtain a converter support device with high reliability, which allows for higher-level performance readily.

In the second converter support device, the slider may have at least a pair of openings on a side face thereof, so that airflow generated by the movement relative to the recording medium flows in via one of the paired openings, passes in a vicinity of a surface of the converter other than a surface thereof facing the recording medium, and thereafter flows out via the other one of the paired openings. This allows the converter to be cooled by the airflow, thereby suppressing temperature rise. Consequently, this makes it possible to obtain a converter support device with high reliability, which allows for higher-level performance readily.

In this case, it is preferable that the plurality of engagement pieces include at least one lower engagement piece and at least two upper engagement pieces, the slider has an even number of pairs of the openings, and the opening via which the airflow flows in is provided on each side of the lower engagement piece so that the lower engagement piece is placed between the openings. This makes it possible to ensure the shock resistant property and the cooling property both.

In the second converter support device, it is preferable that the plurality of engagement pieces have engagement pins, respectively, and engagement holes in which the engagement pins are to be inserted are provided in the suspension or the slider with which the engagement pieces are to be engaged. This makes it possible to achieve a controlling effect against the yawing and rolling of the slider caused by a shock, thereby improving the shock-resistant property.

In this case, at least one of the plurality of engagement pins preferably is inserted in a corresponding one of the engagement holes, irrespective of the relative position between the slider and the suspension. This allows the shock-resistant property to be exhibited at all times irrespective of the posture or position of the slider with respect to the suspension.

In the converter support device having at least one pair of openings, the airflow may pass in the vicinity of a circumferential side surface of the converter. This makes it possible to suppress the temperature rise of the converter with a simple configuration.

Furthermore, in the converter support device having at least one pair of openings, the converter includes an element that generates heat upon information conversion, and the opening via which the airflow flows in preferably is opened to at least a height equal to or more than a height of the element, the height being defined in a direction of a normal of the recording medium as a height direction. Furthermore, the opening via which the airflow flows out also preferably is opened to at least a height equal to or more than a height of the element. This makes it possible to cool the entire heat-generating element of the converter effectively.

Furthermore, in the converter support device having at least one pair of openings, an area of a cross section of an airflow path in the vicinity of the circumferential side surface of the converter, corresponding to an opening width of the opening via which the airflow flows in in a direction of a normal of the recording medium, preferably is smaller than an area of the opening via which the airflow flows in. This increases a flow velocity of the airflow in the vicinities of the circumferential side surfaces of the converter, thereby increasing the cooling ability per unit time. As a result, this further reduces the heat generation of the converter.

Furthermore, in the converter support device having at least one pair of openings, it is preferable that a side of a portion of the slider on which the converter is mounted, the side being farther from the recording medium, is sealed substantially. This further increases the flow velocity of the airflow in the vicinities of the circumferential side surfaces of the converter, thereby further reducing the heat generation.

The following will describe embodiments of the present invention while referring to FIGS. 1 to 13.

[Embodiment 1]

Figure 1B:
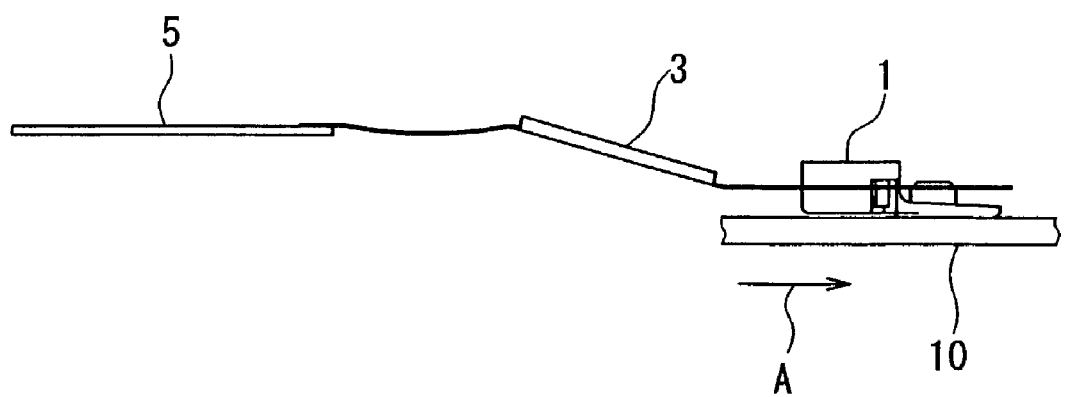
FIG. 1B is a side view illustrating the overall configuration of the converter support device according to Embodiment 1 of the present invention.

FIGS. 1A and 1B are a plan view and a side view illustrating an overall configuration of a converter support device according to Embodiment 1 of the present invention.

In the present embodiment, a magnetic core 2 and a coil 4 may be identical to the magnetic core 102 and the coil 104 of the prior art in all the aspects including materials and detailed structures. 3 denotes a cantilever-type suspension with one end thereof being fixed and the other end thereof being free. On the free end of the suspension 3, a slider 1 is mounted. The suspension 3 is elastically deformable in a direction in which the slider 1 approaches/separates to/from a disk 10 (in a direction of a normal of a surface of the disk 10). The suspension 3 corresponds to the suspension 103 of the prior art, in which a spring portion 3a, a gimbal 3b, and a tonguelet 3c of the suspension 3 are identical to the spring portion 103, the gimbal 103a, and the tonguelet 103b of the prior art, respectively. 5 denotes a head base, which corresponds to the head base 105 of the prior art. These are identical to the corresponding ones of the prior art in materials and functions. A means to pass current to the coil 4 is not shown in the drawings.

1 denotes a slider for mounting thereon a converter that records/reproduces information while moving relatively to the disk 10. The slider 1 functions for separating the converter from the disk 10 at a predetermined distance. The slider 1 corresponds to the slider 101 of the prior art, and may be made of the same material as that in the prior art. The slider 1 is fixed to the tonguelet 3c provided at the free end of the suspension 3. On the fixed end of the suspension 3, the head base 5 is fixed.

In FIG. 1B, the disk 10 as a recording medium is identical to that of the prior art, and moves in a direction indicated by the arrow A relatively to the slider 1, and airflow is generated by the relative movement in the direction indicated by the arrow A with respect to the slider 1.

Figure 2A:
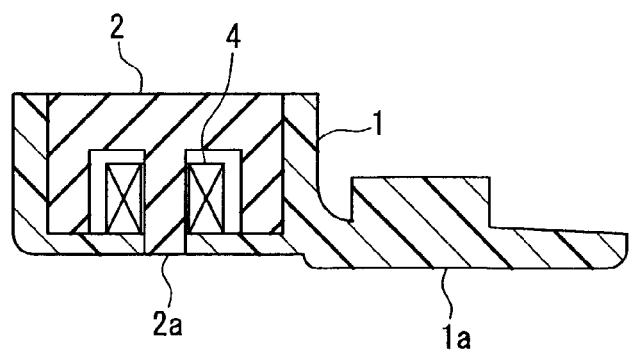
FIGS. 2A to 2C are a side cross-sectional view, a side view, and a bottom view, respectively, of a slider mounted on the converter support device according to Embodiment 1 of the present invention.
Figure 2B:
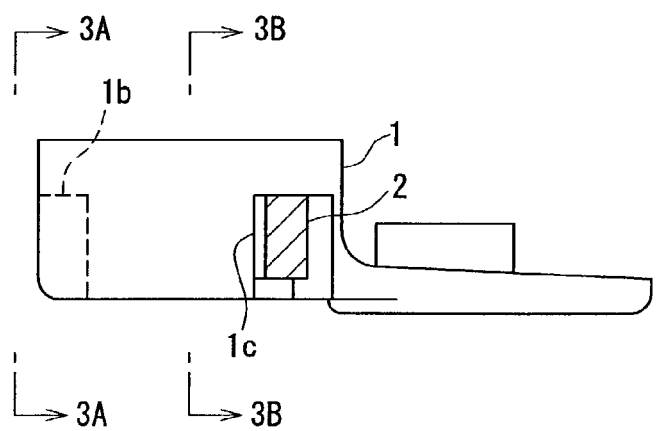
Figure 2C:
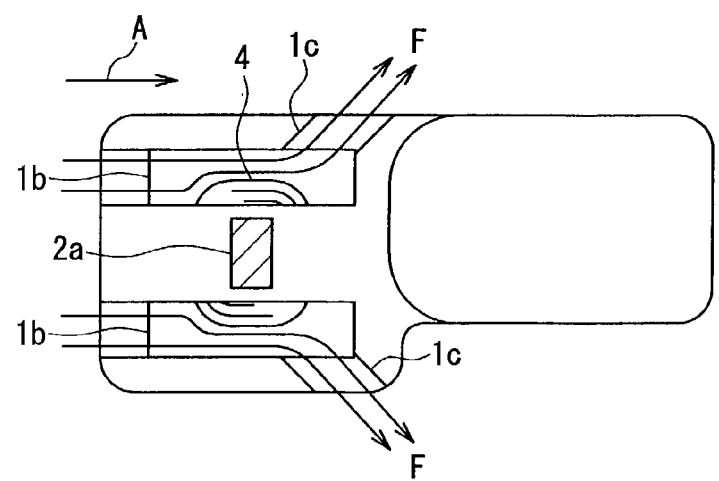

FIG. 2A is a side cross-sectional view of the slider 1, FIG. 2B is a side view of the slider 1, and FIG. 2C is a bottom view of the slider 1. As shown in FIG. 2A, as in the prior art, a converter that records/reproduces information while moving relatively to the disk 10 is mounted inside the slider 1. The converter includes a magnetic core 2 and a coil 4. As shown in FIGS. 2B and 2C, two pairs of a front opening 1b and a rear opening 1c are provided on side faces of the slider 1. The two front openings 1b are provided in the side faces of the slider 1, in front portions thereof in a direction of the movement of the slider 1 relative to the disk 10.

Figure 3A:
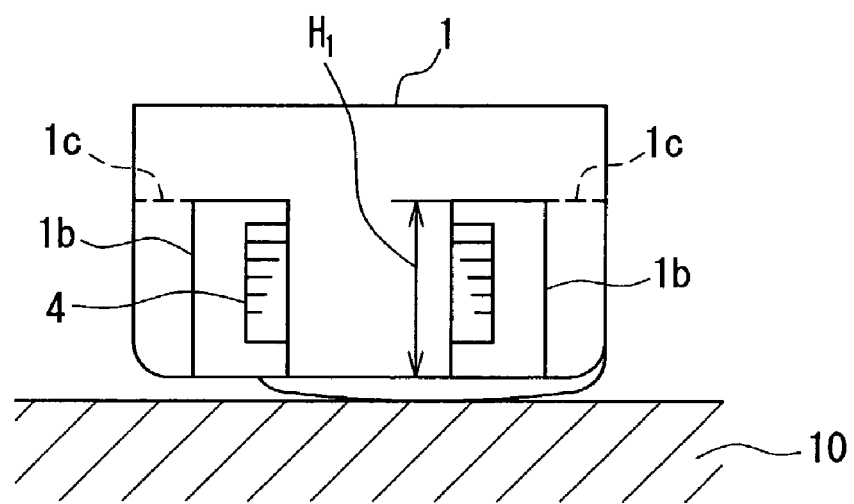
FIG. 3A is a front view of the slider viewed in a direction indicated by arrows of an arrow line 3A—3A in FIG. 2B.
Figure 3B:
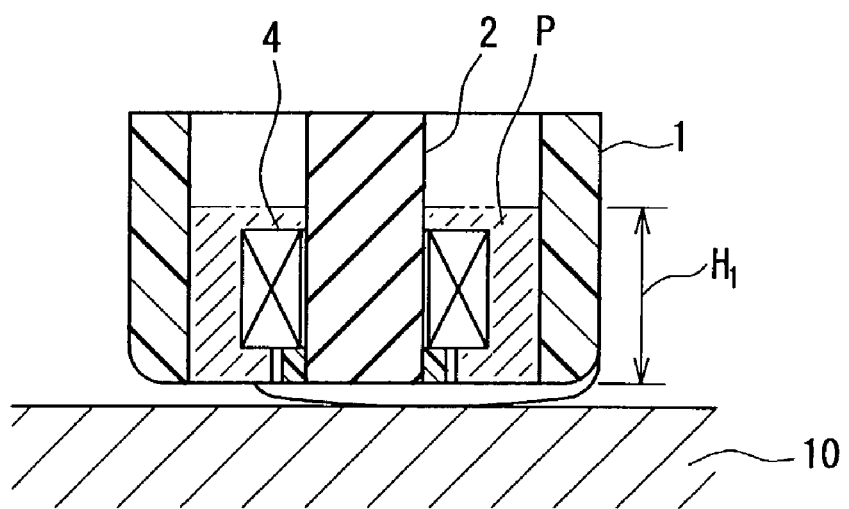
FIG. 3B is a cross-sectional view of the slider taken along an arrow line 3B—3B in FIG. 2B, viewed in a direction indicated by arrows of the arrow line 3B—3B.

FIG. 3A is a front view of the slider 1, viewed in a direction indicated by arrows of an arrow line 3A—3A in FIG. 2B. FIG. 3B is a cross-sectional view of the slider 1 taken along arrow lines 3B—3B in FIG. 2B, viewed in a direction indicated by the arrows of the arrow lines 3B—3B. The front openings 1b are opened to a level higher than a height of the coil 4 in a height direction defined by the direction of the normal of the disk 10. As a result, upper and lower ends of the coil 4 are exposed inside the front openings 1b. The rear openings 1c have a height substantially equal to the height of the front openings 1b. Furthermore, an opening area of the front opening 1b and an opening area of the rear opening 1c are substantially equal to each other. Here, the "opening area" means an area occupied by an opening in a plane substantially perpendicular to a direction of airflow F.

An operation of the converter support device as a whole according to the present embodiment is identical to that in the prior art, and hence, the description of the same is omitted herein.

In the present embodiment, since two sets of paired front and rear openings 1b and 1c are provided on the side faces of the slider 1, the airflow F caused by the relative movement of the disk 10 enters the slider 1 via the front openings 1b, passes through the vicinities of circumferential side surfaces of the magnetic core 2 and the coil 4 composing the converter in a direction substantially parallel with the direction of the relative movement of the disk 10 indicated by the arrow A (hereinafter referred to as relative movement direction A), and thereafter, flows out of the slider 1 via the rear openings 1c. Here, the "circumferential side surfaces" of the magnetic cores 2 and the coil 4 indicate surfaces of the magnetic core 2 and the coil 4 that are substantially parallel with the normal of the disk 10 and substantially parallel with the relative movement direction A of the disk 10, among the outside faces of the magnetic core 2 and the coil 4. When the airflow F passes in the vicinities of the circumferential side surfaces of the magnetic core 2 and the coil 4, heat generated in these members is transferred to the airflow F, which allows the heat to be carried from the slider 1 to the outside.

In a conventional slider, heat generated in the converter is diffused using only airflow generated between a bottom face of the converter (surface facing the disk 10) and the disk 10. In contrast, in the present embodiment, with the front openings 1b and rear openings 1c provided on the side faces of the slider 1, airflow is generated not only in the vicinity of the bottom face of the converter (particularly the magnetic core 2 and the coil 4) but also in the vicinities of the circumferential side surfaces. Therefore, it is possible to diffuse heat efficiently from the circumferential side surfaces of the converter by utilizing the airflow F. This allows the converter to be cooled by the airflow, thereby preventing the temperature rise of the converter, which readily improves the performance and the reliability.

Furthermore, since the front openings 1b and the rear openings 1c are opened to a level higher than the height of the coil 4, the entirety of the coil 4, which is a main heat generator of the converter, can be cooled effectively.

Furthermore, an area of a cross section of an airflow path P in the vicinity of the circumferential side surface of the converter, corresponding to an opening width H1 of each front opening 1b in the direction of the normal of the disk 10 shown in FIG. 3A, (the area indicated by hatching P in FIG. 3B) is smaller than an opening area of each opening of the front and rear openings 1b and 1c. Therefore, as derived from the equation of continuity concerning fluid, a flow velocity of the airflow in the vicinity of the coil 4 is higher than a flow velocity of the airflow when passing through the front openings 1b and the rear openings 1c. This improves the cooling ability per unit time. Therefore, as compared with the prior art, it is possible to reduce the heat generated by the coil 4 significantly.

It should be noted that an example in which openings are formed so that airflow passes in the vicinities of the circumferential side surfaces of the converter is described in the present embodiment, but openings may be provided in the slider 1 so that airflow passes in substantially the same direction as the relative movement direction A along surfaces other than the surface of the converter facing the disk 10, whereby the effect of cooling the converter can be achieved.

Furthermore, in the present embodiment, two pairs of the front and rear openings 1b and 1c are provided in the slider 1 in the present embodiment, but at least one pair of an opening through which airflow flows in and an opening from which the airflow flows out will suffice.

[Embodiment 2]

Figure 4A:
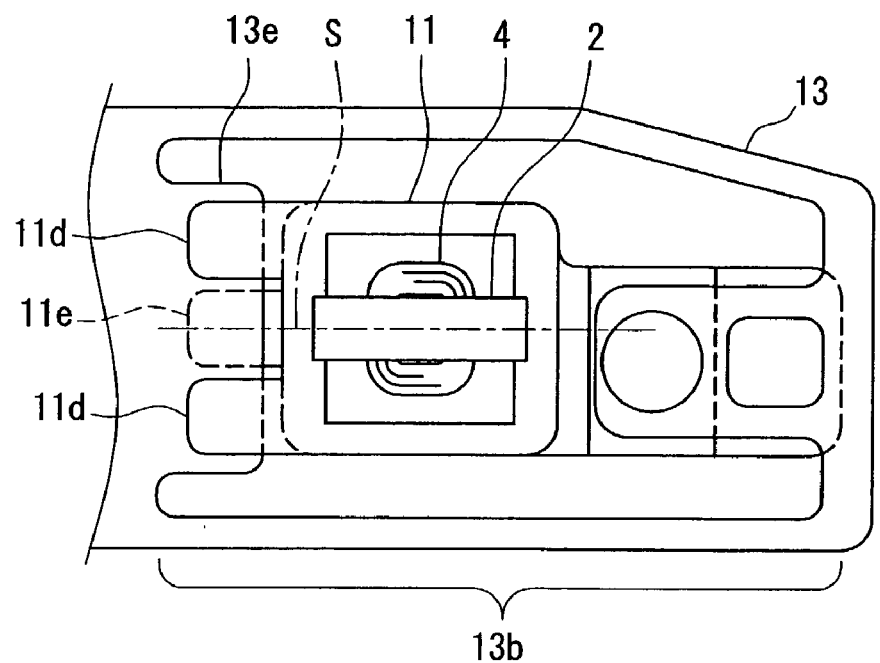
FIG. 4A is a plan view of a portion of a converter support device according to Embodiment 2 of the present invention, at which a slider is attached.
Figure 4B:
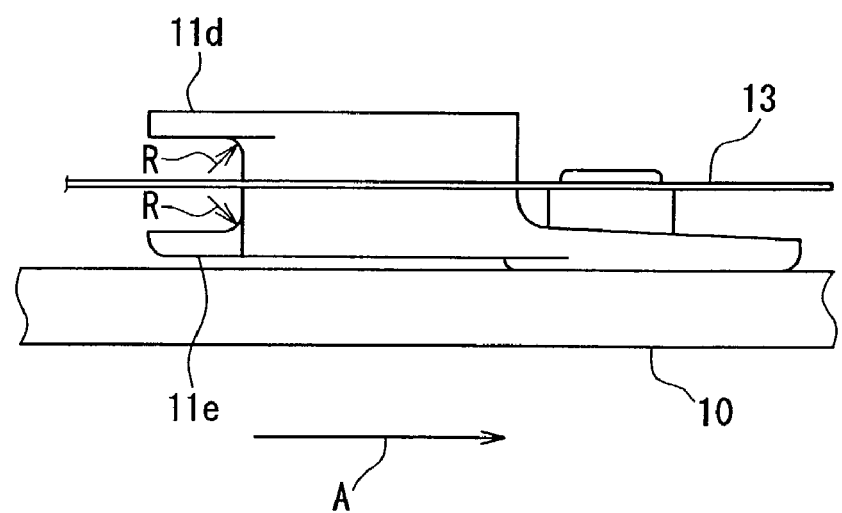
FIG. 4B is a side view of the same.

FIG. 4A is a plan view illustrating principal parts of a converter support device according to Embodiment 2 of the present invention, and FIG. 4B is a side view of the same. A magnetic core 2, a coil 4, and a disk 10 are identical to those according to Embodiment 1. 11 denotes a slider on which the magnetic core 2 and the coil 4 are mounted, like the slider 101 of the prior art.

13 denotes a suspension that is identical to the suspension 3 of Embodiment 1 in all the aspects including a gimbal 13b provided therein except only that the suspension 13 includes an engagement-piece contact portion 13e. The engagement-piece contact portion 13e is formed by extending the suspension 13 toward a slider 11 side.

The slider 11 of the present embodiment differs from the slider 101 of the prior art in that the slider 11 of the present embodiment has two upper engagement pieces 11d and one lower engagement piece 11e. The upper engagement pieces 11d and the lower engagement piece 11e extend in a direction parallel (or substantially parallel) to the disk 10 toward the fixed end of the suspension 13 so that the engagement-piece contact portion 13e is interposed in a vertical direction between the upper and lower engagement pieces 11d and 11e. Where the upper engagement pieces 11d and the lower engagement piece 11e are connected with a main body of the slider 11, stress dispersion structures are formed with a radius R, as shown in the drawing. The upper engagement pieces 11d, the lower engagement piece 11e, and the engagement-piece contact portion 13e are substantially parallel to one another and do not come into contact with one another in normal operation states. The disk 10 moves relative to the slider 11 in a direction indicated by an arrow A, as in the prior art.

In FIG. 4A, an alternate long and short dashed line indicates a symmetry plane S that substantially passes through the center of gravity (or passes exactly through the center of gravity) of the slider 11 including the magnetic core 2 and the coil 4, that is parallel (or substantially parallel) to the relative movement direction A, and that is perpendicular (or substantially perpendicular) to the disk 10. The respective central axes of the engagement-piece contact portion 13e and the lower engagement piece 11e are contained in the symmetry plane S. The two upper engagement pieces 11d do not overlap the lower engagement piece 11e in a direction parallel to the symmetry plane S (a direction of the normal of the disk 10), and are arranged symmetrically with respect to the symmetry plane S so that the symmetry plane S is interposed between the upper engagement pieces 11d.

A distance between the upper engagement pieces 11d and the engagement-piece contact portion 13e, a distance between the lower engagement piece 11e and the engagement-piece contact portion 13e, lengths of protrusions constituting the upper engagement pieces 11d, the lower engagement piece 11e, and the engagement-piece contact portion 13e are set so that in the case where the slider 11 is displaced with respect to the suspension 13 in a manner such that the displacement is within the symmetry plane S, any one of the upper engagement pieces 11d and the lower engagement piece 11e comes into contact with the engagement-piece contact portion 13e before a portion of the suspension 13 in the vicinity of the slider 11 is plastically deformed.

The description of an operation of the device as a whole according to the present embodiment is omitted herein since it corresponds to that of the prior art, but it should be noted that the durability against a shock applied in the direction perpendicular to the disk 10 is improved significantly in the present embodiment, as compared with the prior art. For instance, in the case where the slider 11 is displaced downward due to a shock, the upper engagement pieces 11d come into contact with the engagement-piece contact portion 13e, which prevents the deformation of the gimbal 13b due to an excessive displacement, thereby avoiding the damage. In the case where the slider 11 is displaced upward, the lower engagement piece 11e comes into contact with the engagement-piece contact portion 13e, resulting in that an excessive displacement is avoided.

Furthermore, since a shock-resistant structure (contact structure) composed of the upper engagement pieces 11d, the lower engagement piece 11e, and the engagement-piece contact portion 13e is symmetrical (or substantially symmetrical) with respect to the symmetry plane S passing through the center of gravity of the slider 11, a reaction force containing an unnecessary rotation component such as rolling does not occur even in the case where they are brought into contact by a significant shock.

Furthermore, since the shock-resistant structure is provided at a position relatively close to the center of gravity of the slider 11, the slider 11 is prevented from being displaced before a great moment due to a shock acts on the gimbal 13b. Therefore, the shock-resistant structure has a shock-resistant property that is significantly improved as compared with the prior art.

Furthermore, since the upper engagement pieces 11d and the lower engagement piece 11e are arranged apart from one another so as not to overlap one another in the direction parallel to the symmetry plane S, the slider 11 can be molded using, for example, a so-called two-piece mold structure in which only two of upper and lower molds are used. Thus, the mold structure can be simplified, and hence, the cost can be reduced.

It should be noted that, as engagement pieces for shock resistance in the present embodiment, the upper and lower engagement pieces 11d and 11e are provided in the slider 11 while the engagement-piece contact portion 13e is provided in the suspension 13. If it is possible to further elongate the lengths of the protrusions constituting the upper and lower engagement pieces 11d and 11e, there is no need to protrude the suspension 13 so as to form the engagement-piece contact portion 13e, and it is possible to use the suspension 3 of Embodiment 1 without any modification.

Furthermore, the upper and lower engagement pieces 11d and 11e may be provided in the suspension 13 so as to extend toward the slider 11, and the engagement-piece contact portion 13e may be provided in the slider 11 so as to be interposed in the vertical direction between the upper and lower engagement pieces 11d and 11e. With this configuration, the same effect as that of the above can be achieved.

[Embodiment 3]

Figure 5A:
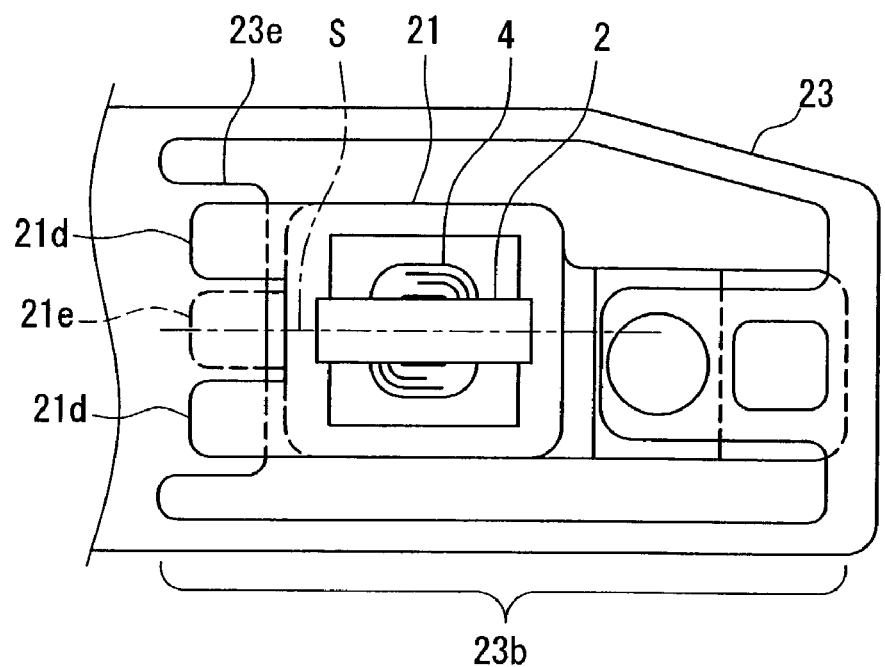
FIG. 5A is a plan view of a portion of a converter support device according to Embodiment 3 of the present invention, at which a slider is attached.
Figure 5B:
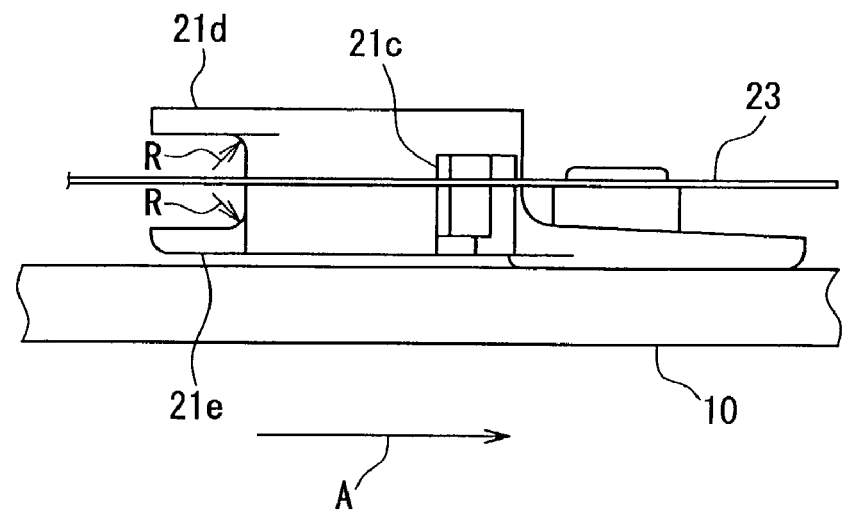
FIG. 5B is a side view of the same.
Figure 6:
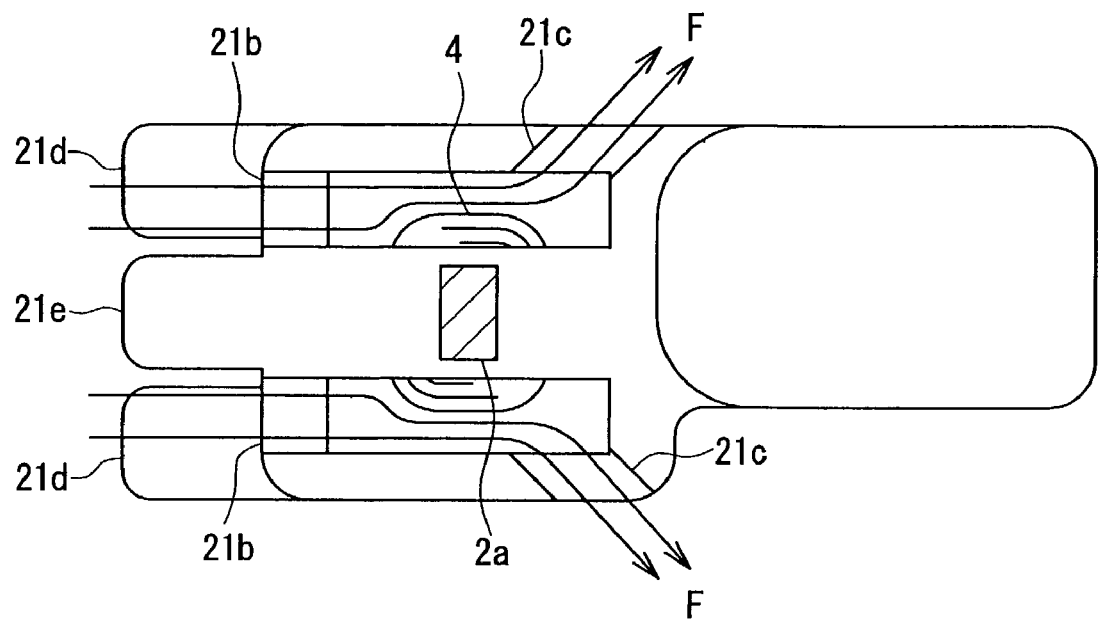
FIG. 6 is a bottom view of the slider mounted on the converter support device according to Embodiment 3 of the present invention.
Figure 7:
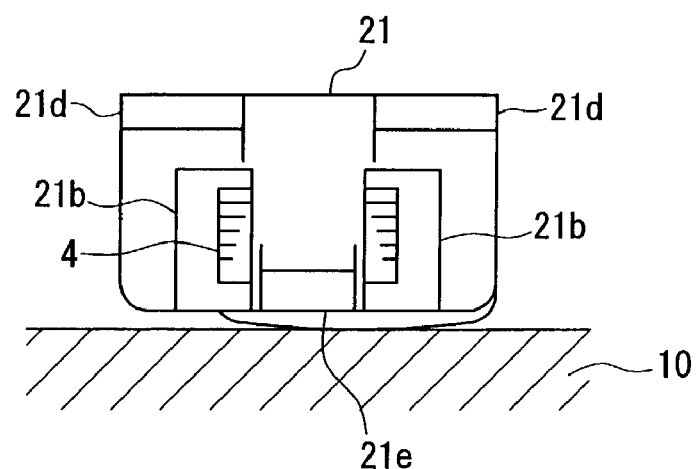
FIG. 7 is a front view of the slider mounted on the converter support device according to Embodiment 3 of the present invention.

FIG. 5A is a plan view illustrating principal parts of a converter support device according to Embodiment 3 of the present invention, and FIG. 5B is a side view of the same. FIG. 6 is a bottom view of a slider according to Embodiment 3 of the present invention, and FIG. 7 is a front view of the slider according to Embodiment 3 of the present invention. A magnetic core 2, a coil 4, and a disk 10 are identical to those according to Embodiment 1. 21 denotes a slider on which the magnetic core 2 and the coil 4 are mounted, like the slider 11 of Embodiment 2. 23 denotes a suspension. The suspension 23 is identical to the suspension 13 of Embodiment 2, and includes a gimbal 23b and an engagement-piece contact portion 23e that are identical also to the gimbal 13b and the engagement-piece contact portion 13e of Embodiment 2, respectively.

As shown in FIG. 6, on side faces of the slider 21, two pairs of a front opening 21b and a rear opening 21c are provided, as in Embodiment 1, so as to guide airflow to the vicinities of circumferential side surfaces of the converter, thereby improving the performance of cooling the converter as in Embodiment 1. Furthermore, a shock-resistant structure (contact structure) identical to that of Embodiment 2 is provided, which is composed of two upper engagement pieces 21d and one lower engagement piece 21e provided in the slider 21, as well as the engagement-piece contact portion 23e provided in the suspension 23.

In FIG. 5A, an alternate long and short dashed line S indicates a symmetry plane S that is defined in the same manner as that in Embodiment 2, and the respective central axes of the engagement-piece contact portion 23e and the lower engagement piece 21e are contained in the symmetry plane S. The two upper engagement pieces 21d do not overlap the lower engagement piece 21e in a direction parallel to the symmetry plane S (a direction of the normal of the disk 10), and are arranged symmetrically with respect to the symmetry plane S so that the symmetry plane S is interposed between the two upper engagement pieces 21d.

As shown in FIG. 7, by arranging the upper engagement pieces 21d and the lower engagement piece 21e as described above, the two front openings 21b can be arranged so that the lower engagement piece 21e is interposed therebetween, and so as to be at positions closer to the disk 10 as compared with the upper engagement pieces 21d. This allows the shock-resistant structure to be provided without blocking the entry of airflow through the front openings 21b. Airflow F due to the relative movement of the disk 10 flows as shown in FIG. 6. This is identical to that in Embodiment 1, and hence, the same effect as that of Embodiment 1 can be achieved.

The description of an operation of the device as a whole according to the present embodiment is omitted herein since it corresponds to that of the prior art. Here, it should be noted that the foregoing configuration is such that the cooling effect achieved by airflow in Embodiment 1 and the shock-resistant effect of Embodiment 2 are achieved both together, without being impaired.

Furthermore, as in Embodiment 2, since the upper engagement pieces 21d and the lower engagement piece 21e are arranged apart from one another so as not to overlap one another in the direction parallel to the symmetry plane S, the advantage of reduced cost, which is achieved by the simplification of the mold structure, can be obtained also as described in Embodiment 2.

[Embodiment 4]

Figure 8A:
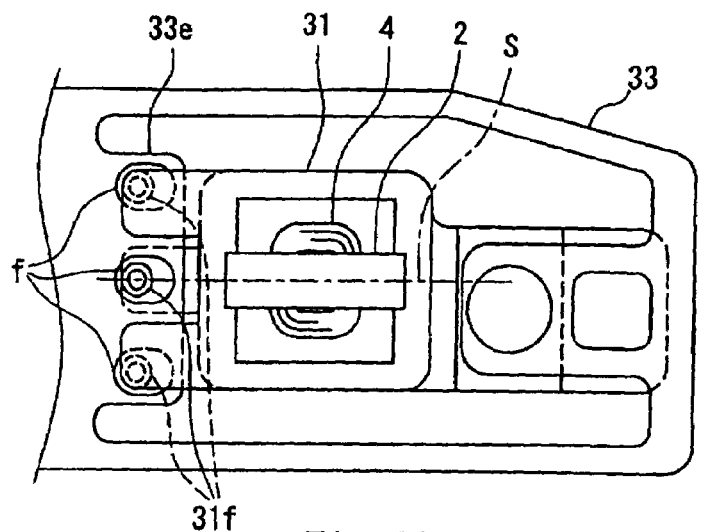
FIG. 8A is a plan view of a portion of a converter support device according to Embodiment 4 of the present invention, at which a slider is attached.
Figure 8B:
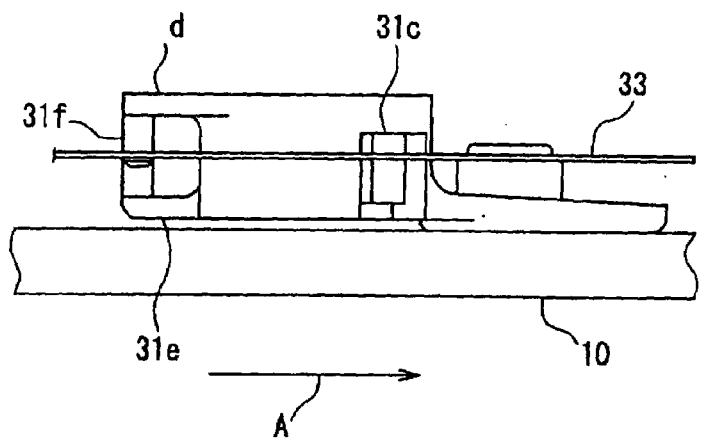
FIG. 8B is a side view of the same.
Figure 8C:
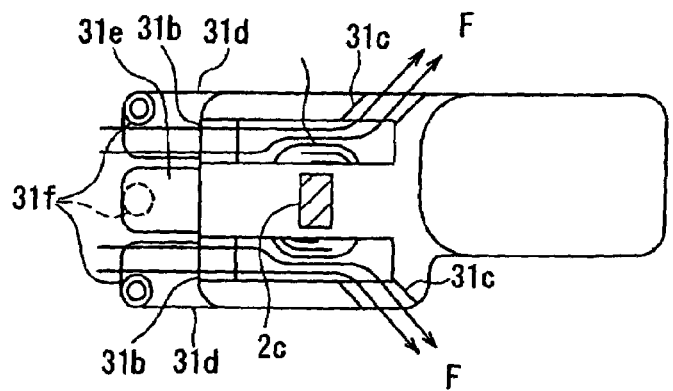
FIG. 8C is a bottom view of the slider mounted on the converter support device according to Embodiment 4 of the present invention.
Figure 9:
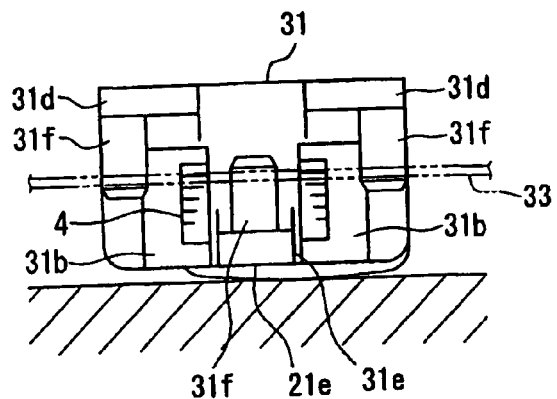
FIG. 9 is a front view of the slider mounted on the converter support device according to Embodiment 4 of the present invention.
Figure 10:
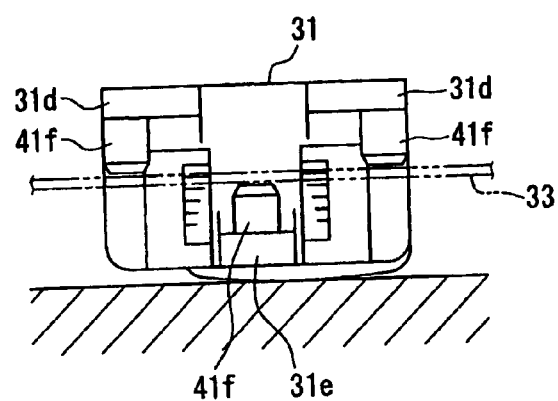
FIG. 10 is a front view of another slider mounted on the converter support device according to Embodiment 4 of the present invention.

FIG. 8A is a plan view illustrating principal parts of a converter support device according to Embodiment 4 of the present invention, FIG. 8B is a side view of the same, and FIG. 8C is a bottom view of a slider according to Embodiment 4 of the present invention. FIG. 9 is a front view of the slider according to Embodiment 4 of the present invention. FIG. 10 is a front view of another slider according to Embodiment 4 of the present invention. A magnetic core 2, a coil 4, and a disk 10 are identical to those according to Embodiment 1. 31 denotes a slider on which the magnetic core 2 and the coil 4 are mounted, like the slider 21 of Embodiment 3.

33 denotes a suspension. The suspension 33 is identical to the suspension 13 of Embodiment 2 except only that three engagement holes 33f are formed in the engagement-piece contact portion 33e.

As in Embodiment 3, the slider 31 has two pairs of a front opening 31b and a rear opening 31c that constitute a cooling structure utilizing airflow, as well as two upper engagement pieces 31d and one lower engagement piece 31e that constitute a shock-resistant structure (contact structure). In the present embodiment, unlike Embodiment 3, the upper and lower engagement pieces 31d and 31e are provided with engagement pins 31f that extend in a direction parallel (or substantially parallel) to a direction of the normal of the disk 10 toward the engagement-piece contact portion 33e. The three engagement pins 31f extending from the upper and lower engagement pieces 31d and 31e are inserted through the three engagement holes 33f provided in the engagement-piece contact portion 33e, with predetermined spaces being maintained. The engagement holes 33f each have an elongated shape, so that the surroundings of the holes are not brought into contact with the engagement pins 31f when the slider 31 is displaced within a normal action range with respect to the suspension 33.

As shown in FIG. 9, lengths of the engagement pins 31f are set so that, when viewed from a direction parallel with a surface of the engagement-piece contact portion 33e, at least any one of the three engagement pins 31f is inserted into a corresponding one of the engagement holes 33f. This configuration can be achieved readily by, when the slider 31 and the suspension 33 are assembled, inserting the engagement pins 31f into the engagement holes 33f by plastically deforming the engagement-piece contact portion 33e.

In FIG. 8A, an alternate long and short dashed line S indicates a symmetry plane that is defined in the same manner as that in Embodiment 2, and the respective central axes of the engagement-piece contact portion 33e and the lower engagement piece 31e are contained in the symmetry plane S. The two upper engagement pieces 31d do not overlap the lower engagement piece 31e in a direction parallel to the symmetry plane S (the direction of the normal of the disk 10), and are arranged symmetrically with respect to the symmetry plane S so that the symmetry plane S is interposed between the upper engagement pieces 31d.

As shown in FIG. 9, by providing the engagement pins 31f on the upper engagement pieces 31d and the lower engagement piece 31e as described above, it is possible to provide the shock-resistant structure without blocking the entry of airflow through the two front openings 31b. Airflow F due to the relative movement of the disk 10 flows as shown in FIG. 8C. This is identical to that in Embodiment 1, and hence, the same effect as that of Embodiment 1 can be achieved.

Though the description of an operation of the device as a whole according to the present embodiment is omitted herein since it corresponds to that of the prior art, it should be noted that both the cooling effect using airflow and the shock-resistant effect achieved in Embodiment 3 are achieved together in the present embodiment. Furthermore, since the engagement pins 31f and the engagement holes 33f are provided, even when the slider 31 yaws or rolls due to a shock, the engagement pins 31f come into contact with the surroundings of the engagement holes 33f thereby controlling the behavior of the slider. Thus, it is possible to prevent the damage to the suspension 33.

Furthermore, with the configuration in which at least any one of the three engagement pins 31f is inserted into a corresponding one of the engagement holes 33f without failure, the shock resistance is exhibited permanently at any posture and any position of the slider 31 with respect to the suspension 33.

It should be noted that in the case where it is required to prevent only the deformation of the suspension 33 when the rolling or the yawing occurs upon a displacement of the slider 31 in a vertical direction (when the displacement is within a plane parallel to the symmetry plane S), shorter engagement pins 41f may be provided so that the pins are engaged only when the slider 31 behaves in such a manner, as shown in FIG. 10. Here, a distance between ends of the engagement pins 41f provided on the upper engagement pieces 31d and an end of the engagement pin 41f provided on the lower engagement piece 31e in the direction of the normal of the disk 10 is greater than a thickness of the engagement-piece contact portion 33e of the suspension 33. The use of such shorter engagement pins 41f facilitates the operation of assembling the slider 31 and the suspension 33.

[Embodiment 5]

Figure 11:
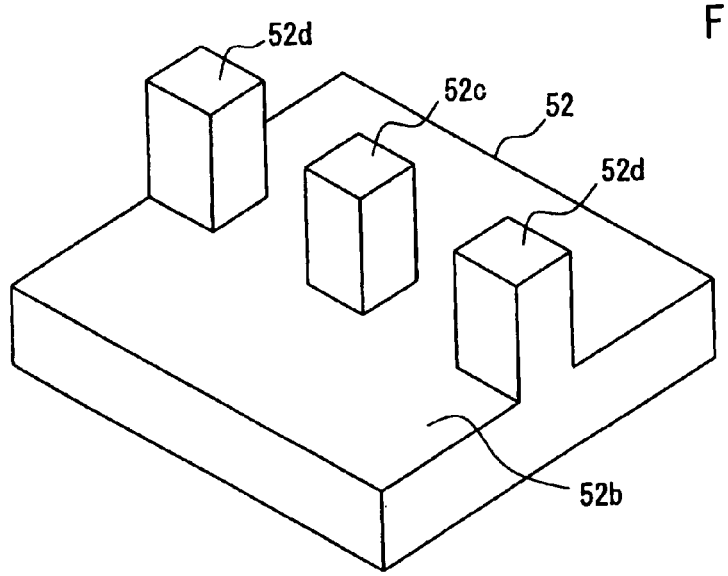
FIG. 11 is a perspective view of a magnetic core for use in a converter support device according to Embodiment 5 of the present invention.

FIG. 11 is a perspective view of a magnetic core 52 for use in a converter support device according to Embodiment 5 of the present invention. The converter support device of the present embodiment is identical to that of Embodiment 4 except for the configuration of the magnetic core.

A cross section of the magnetic core 52, taken along a plane passing a center core 52c and side cores 52d on both sides thereof, has the same "E"-letter shape as that of the magnetic core 2 of Embodiment 4, but the magnetic core 52 of the present embodiment differs from the magnetic core 2 of Embodiment 4 in the aspect that the center core 52c and the side cores 52d are provided on a base 52b that has a greater width than the width of the center core 52c and the side cores 52d.

Figure 12:
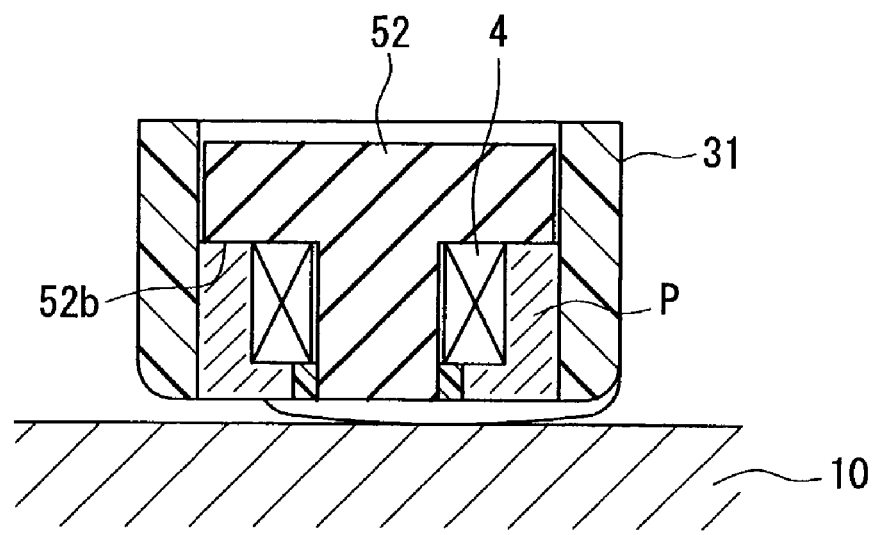
FIG. 12 is a front cross-sectional view of a slider mounted on the converter support device according to Embodiment 5 of the present invention.

FIG. 12 illustrates a cross section of a slider 31 on which the magnetic core 52 is mounted. As shown in the drawing, a width of the base 52b (a dimension in the right-left direction in FIG. 12) is greater than a width of the coil 4 and equal to or smaller than a width of an opening of the slider 31 on the side face thereof farther from the disk 10. The side face of the slider 31 farther from the disk 10 is sealed substantially with the base 52b of the magnetic core 52. Consequently, airflow follows an airflow path P surrounded by the slider 31 and the base 52b. In other words, with the presence of the base 52b, the airflow from the front openings 31b does not flow through a side above the coil 4 (a side opposite to the disk 10 with respect to the coil 4), and an area of a cross section of the airflow path P in the vicinity of a circumferential side surface of the converter, corresponding to an opening width in the height direction of the front opening 31b, (the area indicated by hatching P in FIG. 12) is smaller than that of Embodiment 4. Therefore, it is possible to improve the effect of cooling the coil 4. Furthermore, heat of the magnetic core 52 is radiated via the base 52b having a large surface area. Since the base 52b is cooled with airflow, it is possible to improve the effect of cooling the magnetic core 52.

Figure 13:
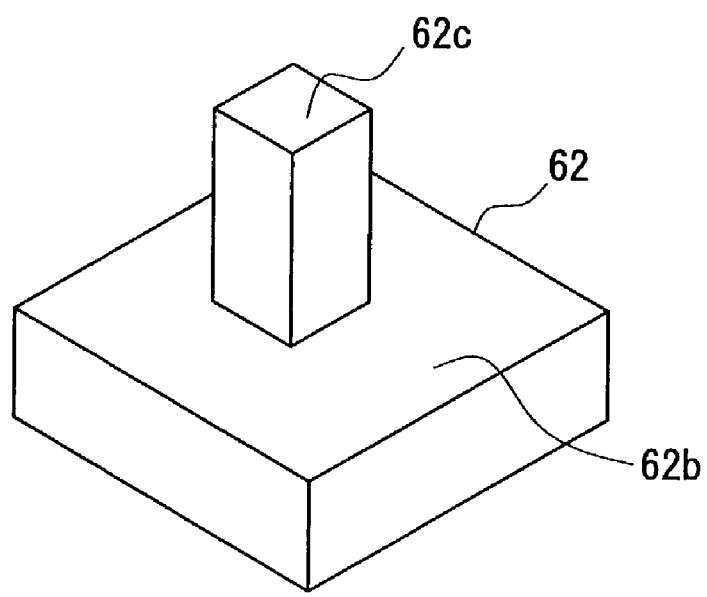
FIG. 13 is a perspective view of another magnetic core for use in the converter support device according to Embodiment 5 of the present invention.
Figure 14A:
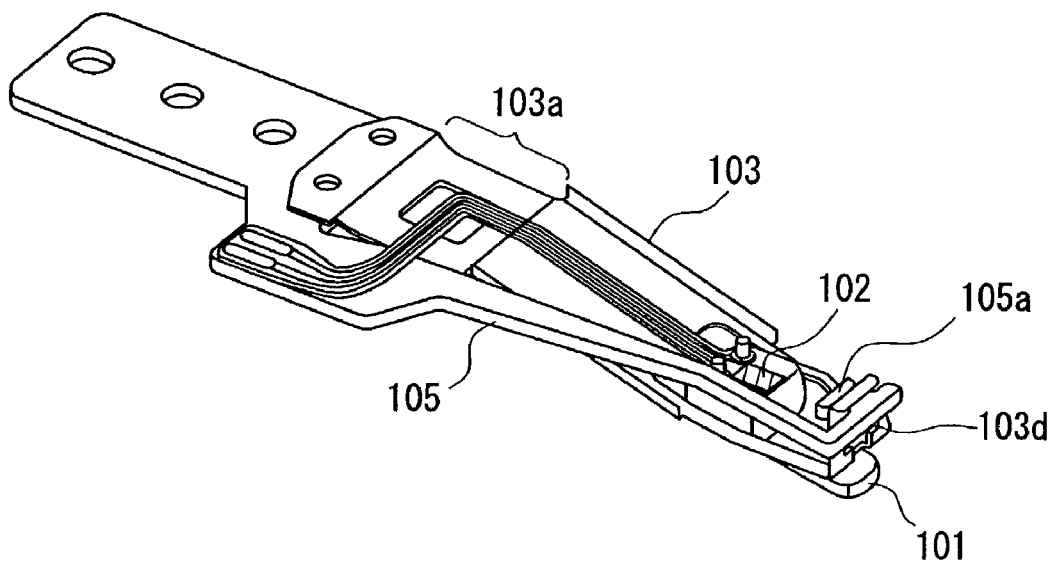
FIG. 14A is a perspective view illustrating an overall configuration of a conventional converter support device.
Figure 14B:
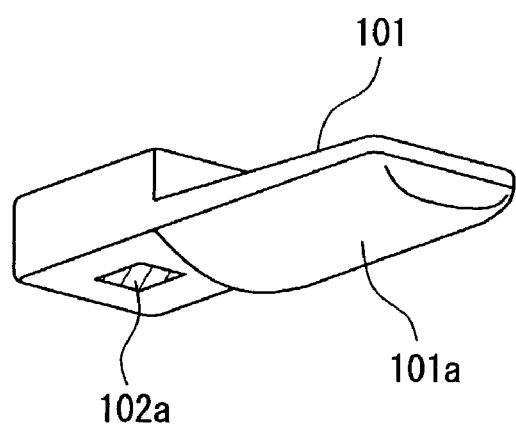
FIG. 14B is a perspective view of a slider mounted on the conventional converter support device shown in FIG. 14A.
Figure 15:
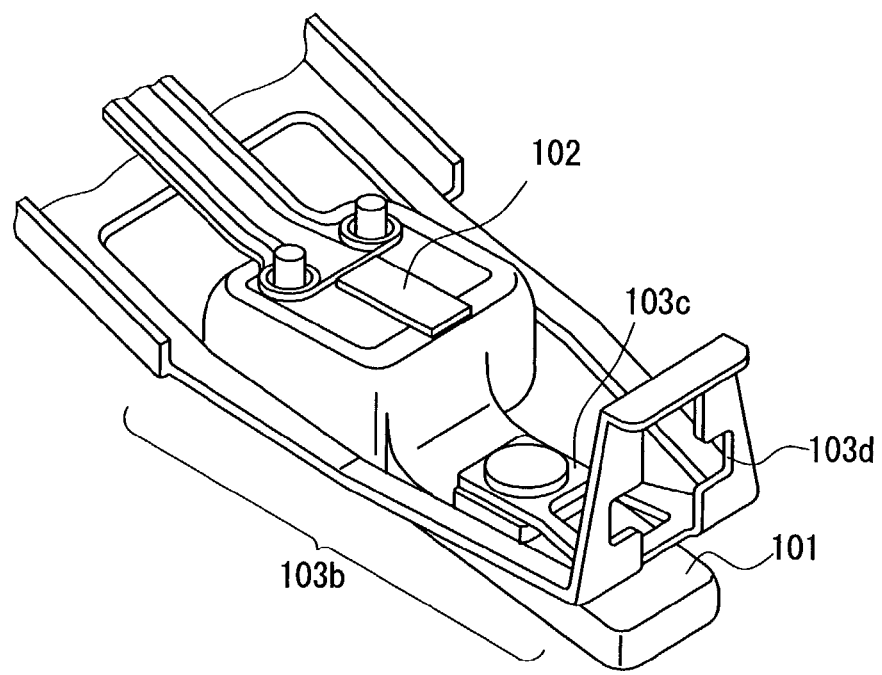
FIG. 15 is a perspective view of a portion of the conventional converter support device shown in FIG. 14A, at which the slider is attached.
Figure 16:
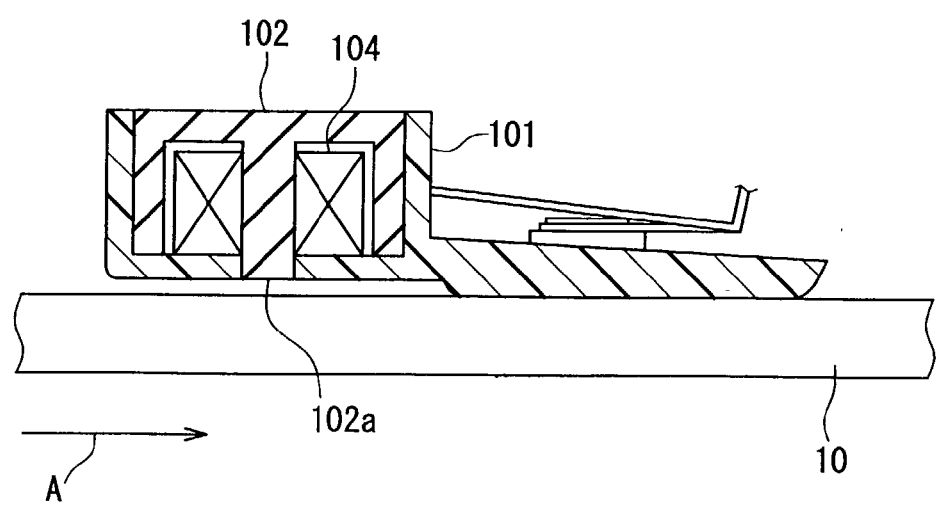
FIG. 16 is a side cross-sectional view illustrating a state in which the slider of the conventional converter support device shown in FIG. 14A is slid on a disk.

FIG. 13 is a perspective view of another magnetic core 62 according to the present embodiment. The magnetic core 62 differs from the magnetic core 52 shown in FIG. 11 in the aspect that the magnetic core 62 does not have side cores on both sides of a center core 62c. Since the magnetic core 62 includes a base 62b wider in width, it is possible to achieve the same cooling effect as that for the magnetic core 52.

It should be noted that the magnetic cores 52 and 62 shown in Embodiment 5 can be used in the above-described embodiments except for Embodiment 4, and in the case where they are used in Embodiment 1 or 3 in which the slider has the front and rear openings, it is possible to achieve the same cooling effect as described above.

Furthermore, though a magnetic head composed of a magnetic core and a coil is used as an example of a converter in Embodiments 1 to 5 described above, any other type of a converter such as a semiconductor laser or another electrical/optical converter may be used as long as it is practical.

Furthermore, in Embodiments 1 to 5 above, if surfaces of the magnetic core and the coil on a side facing the dick 10 can be exposed completely, such a configuration is desirable from the viewpoint of the cooling effect.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A converter support device, comprising:
    a converter that records or reproduces information to or from a recording medium while moving relative to the recording medium; and
    a slider that separates the converter from the recording medium at a predetermined distance,
    wherein
    the slider has at least a pair of openings on a side face thereof substantially perpendicular to the recording medium, and airflow generated by the movement relative to the recording medium flows in via one of the paired openings, passes in a vicinity of a surface of the converter other than a surface thereof facing the recording medium so as to cool the converter, and thereafter flows out via the other one of the paired openings.

2. A converter support device, comprising:
    a converter that records or reproduces information to or from a recording medium while moving relative to the recording medium;
    a slider that separates the converter from the recording medium at a predetermined distance; and
    a suspension having a fixed end on one side and a free end on the other side, with the slider being mounted on the free end, the suspension being elastically deformable in a direction in which the slider approaches to or separates from the recording medium,
    wherein a plurality of engagement pieces are extended in a direction substantially parallel to the recording medium, either from a part of the suspension toward the slider, or from a part of the slider toward the fixed end of the suspension, wherein the plurality of engagement pieces include a lower engagement piece provided on a side closer to the recording medium, and an upper engagement piece provided on a side farther from the recording medium, the lower engagement piece is arranged substantially symmetrically with respect to a symmetry plane that substantially passes through a center of gravity of the slider, that is substantially parallel to a direction of the relative movement, and that is substantially perpendicular to the recording medium, the upper engagement piece is arranged substantially symmetrically with respect to the symmetry plane, and the lower engagement piece and the upper engagement piece are arranged so that they do not overlap each other in a direction of a normal of the recording medium, and when the slider is displaced relative to the suspension, at least a part of the plurality of engagement pieces is engaged with the suspension or the slider before a portion of the suspension in the vicinity of the slider is deformed plastically.

3. The converter support device according to claim 2, wherein the slider has at least a pair of openings on a side face thereof, and airflow generated by the movement relative to the recording medium flows in via one of the paired openings, passes in a vicinity of a surface of the converter other than a surface thereof facing the recording medium, and thereafter flows out via the other one of the paired openings.

4. The converter support device according to claim 3, wherein the plurality of engagement pieces include at least one lower engagement piece and at least two upper engagement pieces, the slider has an even number of pairs of the openings, and the opening via which the airflow flows in is provided on each side of the lower engagement piece so that the lower engagement piece is placed between the openings.

5. The converter support device according to claim 2, wherein the plurality of engagement pieces have engagement pins, respectively, and engagement holes in which the engagement pins are to be inserted are provided in the suspension or the slider with which the engagement pieces are to be engaged.

6. The converter support device according to claim 5, wherein at least one of the plurality of engagement pins is inserted in a corresponding one of the engagement holes, irrespective of a relative positional relationship between the slider and the suspension.

7. The converter support device according to claim 1, wherein the airflow passes in a vicinity of a circumferential side surface of the converter.

8. The converter support device according to claim 3, wherein the airflow passes in a vicinity of a circumferential side surface of the converter.

9. The converter support device according to claim 1, wherein the converter includes an element that generates heat upon information conversion, and the opening via which the airflow flows in is opened to at least a height equal to or more than a height of the element, the height being defined in a direction of a normal of the recording medium as a height direction.

10. The converter support device according to claim 3, wherein the converter includes an element that generates heat upon information conversion, and the opening via which the airflow flows in is opened to at least a height equal to or more than a height of the element, the height being defined in a direction of a normal of the recording medium as a height direction.

11. The converter support device according to claim 7, wherein an area of a cross section of an airflow path in the vicinity of the circumferential side surface of the converter, corresponding to an opening width of the opening via which the airflow flows in a direction of a normal of the recording medium, is smaller than an area of the opening via which the airflow flows in.

12. The converter support device according to claim 8, wherein an area of a cross section of an airflow pat in the vicinity of the circumferential side surface of the converter, corresponding to an opening width of the opening via which the airflow flows in a direction of a normal of the recording medium, is smaller than an area of the opening via which the airflow flows in.

13. The converter support device according to claim 1, wherein a side of a portion of the slider on which the converter is mounted, the side farther from the recording medium in use, is sealed substantially.

14. The converter support device according to claim 3, wherein a side of a portion of the slider on which the converter is mounted, the side farther from the recording medium in use, is sealed substantially.

15. The converter support device according to claim 1, wherein the converter comprises a conductor constituting a closed circuit, and assuming that a side where the airflow flows in the slider is an upstream side with respect to the slider, when the slider is seen from the upstream side in parallel with a direction of the relative movement, the conductor is visually recognized in the one of the paired openings in which the airflow flows.

* * * * *

UNITED STATES PATENT AND TRADEMARK OFFICE
CERTIFICATE OF CORRECTION

| | |
|---|---|
| PATENT NO. | : 7,159,228 B2 |
| APPLICATION NO. | : 10/316702 |
| DATED | : January 2, 2007 |
| INVENTOR(S) | : Mizuno et al. |

It is certified that error appears in the above-identified patent and that said Letters Patent is hereby corrected as shown below:

Column 16, line 33(claim 12): "pat" should read --path--.

Signed and Sealed this

Tenth Day of July, 2007

JON W. DUDAS
*Director of the United States Patent and Trademark Office*